United States Patent [19]

Hillen et al.

[11] Patent Number: 4,676,345
[45] Date of Patent: Jun. 30, 1987

[54] SELF-ENERGIZING DISC BRAKES

[75] Inventors: Klaus Hillen, Neuwied, Fed. Rep. of Germany; Anthony G. Price, Gwent, Wales; Roy Campbell, Worcestershire, England

[73] Assignee: Lucas Ind. Public Limited Co., Birmingham, England

[21] Appl. No.: 828,946

[22] Filed: Feb. 12, 1986

[30] Foreign Application Priority Data

Feb. 13, 1985 [GB] United Kingdom ................ 8503669

[51] Int. Cl.$^4$ ...................... F16D 55/14; F16D 55/08; F16D 65/38
[52] U.S. Cl. ................... 188/72.2; 188/72.7; 188/196 V
[58] Field of Search ............. 188/71.4, 71.5, 71.7, 188/72.2, 72.7, 72.8, 196 M, 196 V, 206 A, 343, 342; 192/70.25, 70.26, 70.23

[56] References Cited

U.S. PATENT DOCUMENTS 1,449,273 3/1923 Erhart et al. ............... 188/196 M
3,203,507 8/1965 Bond .................................. 188/71.4

FOREIGN PATENT DOCUMENTS 1030312 5/1966 United Kingdom .
1288027 9/1972 United Kingdom ............... 188/71.4
2052654 1/1981 United Kingdom ........... 188/196 M Primary Examiner—Andres Kashnikow
Assistant Examiner—Robert J. Oberleitner
Attorney, Agent, or Firm—Daniel J. Hudak Co.

[57] ABSTRACT

In a self-energizing disc brake of the spreading type the angular position of a pressure plate in a retracted "brakes-off" position is determined by an adjuster member comprising a cam which cooperates with the plate and of which the relative position is adjustable. The cam is carried by a cam shaft which is radially or axially arranged, and is accessible from the exterior of the housing of the brake. The cam may be incorporated into and comprise the stop abutment for arresting angular movement of one of the plates when the brake is applied.

3 Claims, 6 Drawing Figures

FIG.4.

SELF-ENERGIZING DISC BRAKES

This invention relates to self-energising disc brakes of the kind in which rotatable friction discs provided with linings of friction material are adapted to be brought into engagement with spaced opposed braking surfaces in a housing by pressure plates located between the friction discs and centred by stationary pilot lugs, balls or rollers are located in co-operating oppositely inclined recesses in the adjacent faces of the pressure plates, and the application of the brake is initiated by moving the pressure plates angularly in opposite directions, the pressure plates then moving apart, due to the tendency for the balls or rollers to ride up ramps defined by the edges of the recesses, and into engagement with the friction discs which are urged into engagement with the braking surfaces, and the pressure plates are carried round with the friction discs until one is arrested by the engagement of a lug on the plate with a drag-taking stop abutment in the housing, the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

In brakes of the kind set forth it is desirable to provide means for adjusting the relative angular positions of the pressure plates in order to compensate for wear of the friction linings by taking up any increase in the relative angular movement between the pressure plates when the application of the brake is initiated. This is normally achieved by adusting, either manually or automatically, the length of a transmission mechanism through which the brake is applied. This, in turn, has the effect of holding the plates in a relative angularly displaced applied position with the balls or rollers held partially up the ramps.

It is also known, for example from GB No. 1,030,312, to adjust the position of each of two separate stop abutments to reduce the angular distance through which the plates are carried round with the discs until the movement of one of the plates is arrested. In GB No. 1,030,312 this is achieved by screwing a pair of bolts, inclined in opposite directions, through angularly spaced pilot lugs so that a lug on a respective plate is engageable with the inner end of a respective bolt to arrest angular movement of the respective plate.

According to our invention, in a disc brake of the kind set forth the angular position of a pressure plate in a retracted "brake off" position is determined by an adjuster member which co-operates with the plate and of which the relative position is adjustable.

Conveniently the adjuster member comprises a cam which is carried by a rotatable cam shaft and co-operates with a lug on the plate.

In such a construction the cam shaft is accessible from the exterior of the housing.

The cam shaft may be radially or axially arranged and may carry one or two cams for co-operation with both plates.

In a preferred construction the or each cam is incorporated into and comprises the stop abutment for arresting angular movement of one of the plates when the brake is applied.

Our invention is particularly useful for a brake in which the relative angular movement of the pressure plates is initiated by an hydraulic actuator acting between lugs on the two plates. Since no other brake-applying transmission means is provided, the possibility of combining an adjuster in such a transmission does not arise.

Two embodiments of our invention are illustrated in the accompanying drawings in which:

FIG. 4 is a view in the direction of the arrow "4" in FIG. 1;

Figure 1:
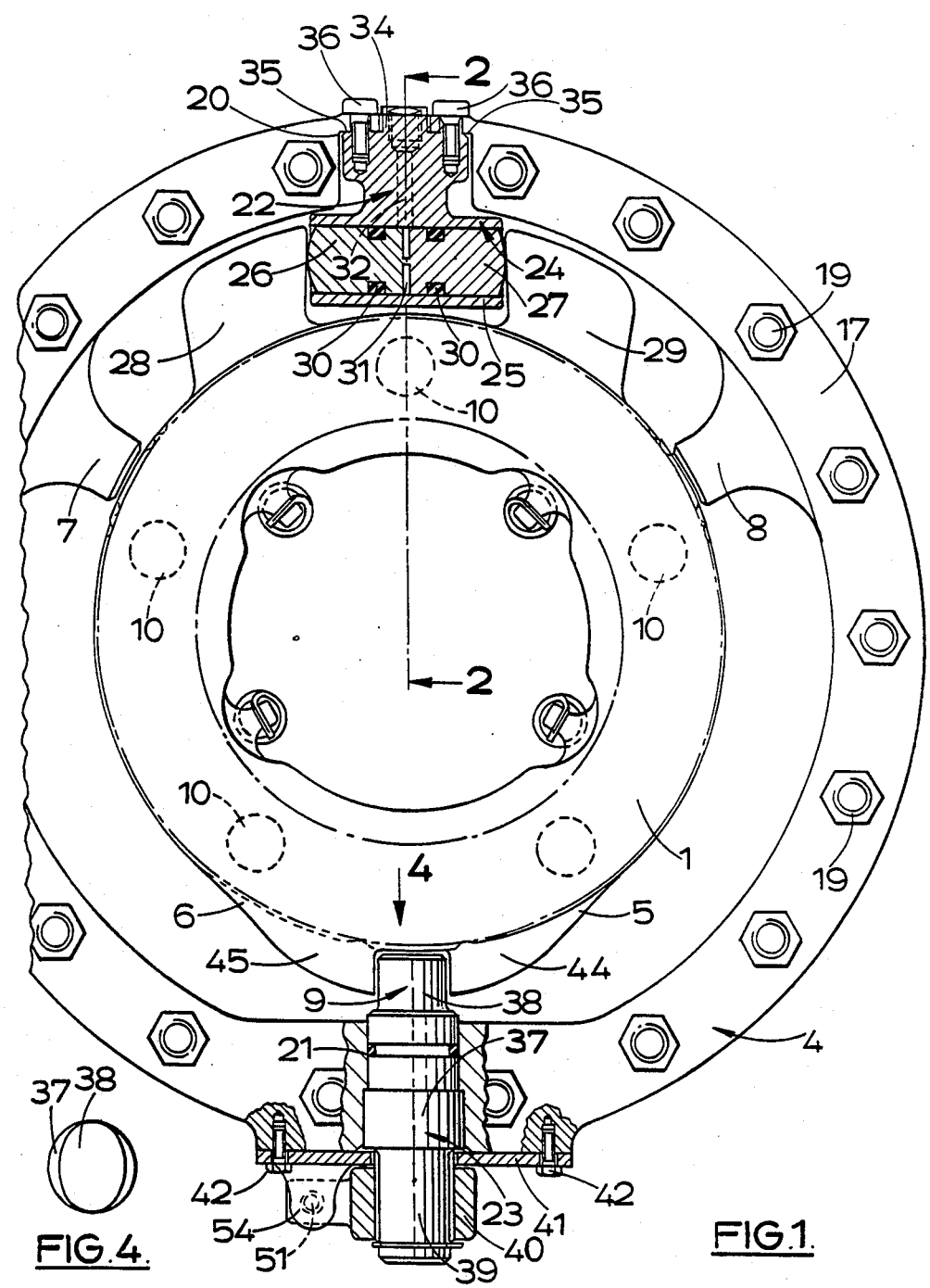
FIG. 1 is an end view of a portion of a spreading brake.
Figure 2:
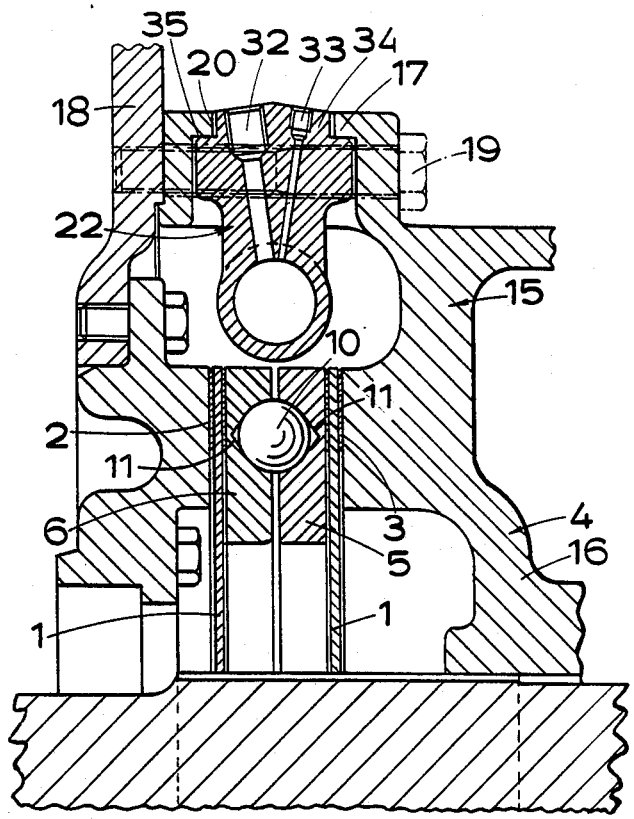
FIG. 2 is a section on the line 2—2 of FIG. 1.
Figure 3:
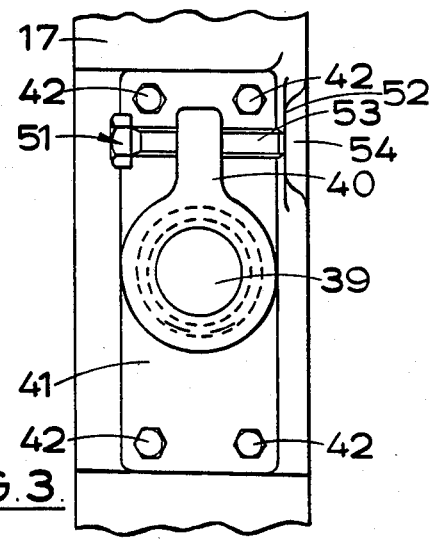
FIG. 3 is a plan of the adjuster mechanism.

The brake illustrated in FIGS. 1-4 of the drawings is of a conventional spreading type in which two rotatable friction discs 1 provided with friction linings are adapted to be brought into engagement with spaced opposed braking surfaces 2, 3 in a housing 4 by pressure plates 5, 6 located between the discs 1 and centred by three angularly spaced stationary pilots 7, 8, 9. Balls 10 are located in co-operating oppositely inclined recesses 11 in the adjacent faces of the pressure plates 5, 6.

The application of the brake is initiated by moving the pressure plates 5, 6 angularly in opposite directions which causes the pressure plates 5, 6 to move axially relatively away from each other due to the tendency for the balls 10 to ride up ramps defined by the end faces of the recesses 11. This urges the friction discs into engagement with the faces 2 and 3 in the housing 4. The pressure plates 5, 6 are then carried round with the discs until one is arrested by the engagement of a lug on a respective plate with a drag-taking abutment, as will hereinafter be described, whereafter continued angular movement of the other plate provides a servo action.

The housing 4 comprises a first member 15 in the form of a casting comprising an end wall 16 of which the inner face constitutes the braking surface 3, and an integral, axially extending, annular flange constituting a radial wall 17. The open face at the free end of the flange 17 is closed by an end plate 18 bolted to the casting 15 by angularly spaced bolts 19.

A stepped radial opening 20 in the flange 17 provides a mounting for an hydraulic actuator 22 by means of which the brake is actuated hydraulically, and a diametrically opposite radial opening 21 provides a mounting for an adjuster mechansim 23.

As illustrated, the hydraulic actuator 22 comprises a cylinder 24 having an open-ended longitudinal through-bore 25 in which work a pair of oppositely acting pistons 26, 27 for engagement with lugs 28 and 29 on the plates 5, 6. Each piston 26, 27 carries a seal 30 adjacent to its inner end. A pressure space 31 defined in bore 21 between adjacent inner ends of the pistons 26 and 27 is connected to a master cylinder through a passage 32, and a bleed passage 33 also leads from the pressure space 31.

The cylinder 24 is integral with the inner end of a spigot 34 of which the outer end is clamped against a face 35 at a shoulder at a step in diameter by means of bolts 36.

The adjuster mechanism 23 comprises a cam shaft 37 which is of stepped outline complementary to that of the bore 21 in which it is rotatably mounted together with a seal which it carries, a cam 38 integral with the inner portion of the cam shaft 37 which is of smaller diameter, and an outer portion 39 which projects from the housing 4 and on which an angularly movable radial adjuster arm 40 is splined. The cam shaft 37 is retained in the bore 21 by means of a retaining plate 41, which is secured to the exterior of the flange 17 by means of bolts 42 and has a central opening of a diameter smaller than the portion of the cam shaft 37 which is of greater diameter, but larger than the splined portion 39 which projects through it. The cam 38 is eliptical in section as shown in FIG. 4.

The inner end of the cam 38 defines the pilot 9.

A bolt 51 is adjustably screwed through the arm 40 and the free end of the shank 53 of the bolt 51 abuts against an abutment face 52 on a lug 54 on the housing 5.

When the brake is applied, the pressure space 31 is pressurised to urge the pistons 26, 27 in opposite directions and the plates 5, 6 angularly and axially as described above until the movement of one of the plates 5, 6 is arrested by the engagement of a respective lug 44, 45 with the cam 38 which acts as the drag-taking abutment. Thereafter the further operation of the brake is as described above.

By screwing the bolt 51 through the arm 40, the angular position of the cam 38 can be adjusted. Since this, in turn, determines the retracted position of the two plates 5, 6, by separating the two lugs 44, 45 the plates 5, 6 will separate due to the effect of the balls 10 co-operating with the ramps in the recesses 12, 13. The retracted position of the pressure plates 5, 6 can therefore be adjusted to compensate for wear of the friction linings of the plates 1.

Figure 5:
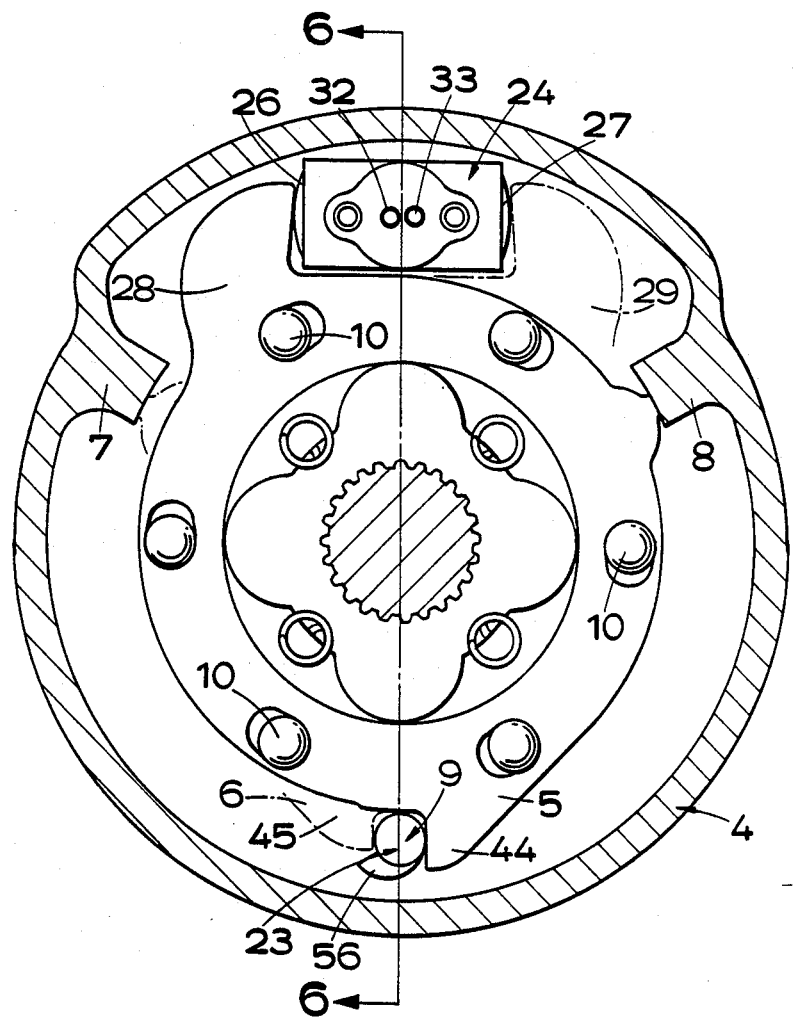
FIG. 5 is a view similar to FIG. 1 on the line 5—5 of FIG. 6.
Figure 6:
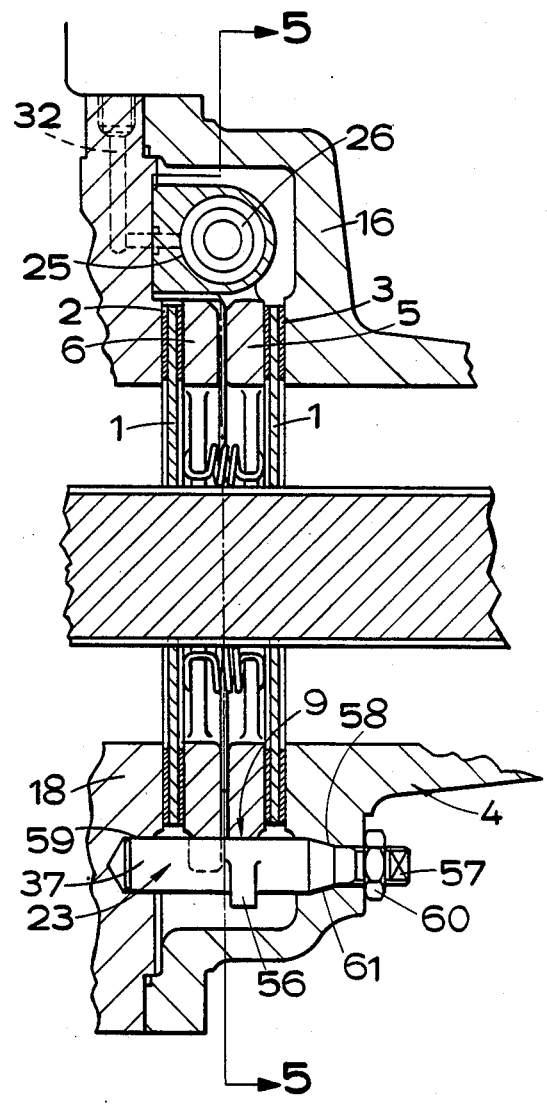
FIG. 6 is a section on the line 6—6 of FIG. 5.

In the brake illustrated in FIGS. 5 and 6 the cam shaft 37 extends axially to act as the pilot 9 and is journalled for rotation at opposite ends in bores 58, 59 in the end walls 16 and 18 of the housing 4. The cam shaft 37 carries a cam 56 for engagement with the lug 44 on the plate 5. The cam shaft 23 has a stem 57 of reduced diameter which projects outwardly from the end wall 16 and is threaded to receive a lock nut 60 which locks the cam shaft 23 against rotation by clamping an inclined shoulder 61 against a complementary face in the bore 58. The free end of the stem 57 is of square or other non-circular outline to receive a spanner by means of which the cam shaft 23 can be rotated after the lock nut 60 has first been slackened.

By rotating the cam shaft 37, as in the brake of FIGS. 1–4, the angular position of the cam 56 can be adjusted which, in turn, determines the retracted position of the plate 5 which is the plate which is arrested when the brake is applied with the discs 1 rotating in a normal forward direction.

The cam shaft 37 may carry a second cam for adjusting simultaneously with adjustment of the plate 5, the relative position of the plate 6.

In the brake the cylinder 24 is carried from the end plate 18 and the opening 20 in the flange 27 is omitted.

The construction and operation of the brake of FIGS. 5 and 6 is otherwise the same as that of FIGS. 1–4, and corresponding reference numerals have been applied to corresponding parts.

We claim:

1. A self-energising disc brake comprising a housing, first and second axially spaced braking surfaces in said housing, radial pilot lugs and a drag-taking stop abutment in said housing, first and second pressure plates centred on said pilot lugs, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material carried by opposite faces of each said disc, said first linings each being engageable with a respective adjacent one of said pressure plates and said second friction linings each being engageable with a respective adjacent one of said braking surfaces, and means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried around with said discs until one of said plates is arrested by the engagement of a lug on that plate with said drag-taking stop abutment, whereafter continued angular movement of the other of said plates provides a servo action, wherein the angular position of at least one of said pressure plates in a retracted "brake off" position is determined by an adjuster member comprising a radially arranged cam shaft having inner and outer portions, said inner portion carrying a cam which co-operates with a lug provided on said at least one plate, said outer portion of said cam shaft projecting from said housing and having an adjuster arm fast with said outer portion, said adjuster arm being angularly movable to adjust the angular position of said cam and thereby determine said relative angular position of said at least one plate.

2. A disc brake as claimed in claim 1, wherein said adjuster member comprises a radial arm and a bolt screwed through said arm, said bolt being adjustable to cause angular movement of said arm.

3. A self-energising disc brake comprising a housing, first and second axially spaced braking surfaces in said housing, raidal pilot lugs and a drag-taking stop abutment in said housing, first and second pressure plates centred on said pilot lugs, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material carried by opposite faces of each said disc, said first linings each being engageable with a respective adjacent one of said pressure plates and said second friction linings each being engageable with a respective adjacent one of said braking surfaces, and means for moving said pressure plates angularly relative to said housing to initiate application of said brake with said pressure plates also moving axially to urge the friction members into engagement with said braking surfaces due to a tendency for said rolling bodies to ride up ramps defined by said adjacent faces and constituting camming means, said plates being carried around with said discs until one of said plates is arrested by the engagement of a lug on that plate with said drag-taking stop abutment, whereafter continued angular movement of the other of said plates provides a servo action, wherein the angular position of at least one of said pressure plates in a retracted "brake off" position is determined by an adjuster member comprising an axially arranged cam shaft journalled for rotation in bores in opposite end walls of said housing and arranged to co-operate with a lug provided on said at least one plate, said cam shaft having a stem which projects outwardly from at least one of said end walls and is of non-circular outline so as to co-operate with a tool by means of which said cam shaft can be rotated about its axis to adjust the angular position of said cam thereby determining said relative angular position of said at least one plate.

* * * * *